March 17, 1942.  M. G. MANDEL  2,276,585

SUN VISOR

Filed Sept. 23, 1939

INVENTOR
MILLARD G. MANDEL

BY

ATTORNEY

Patented Mar. 17, 1942

2,276,585

UNITED STATES PATENT OFFICE 2,276,585

SUN VISOR

Millard G. Mandel, University City, Mo.

Application September 23, 1939, Serial No. 296,212

2 Claims. (Cl. 296—97)

This invention relates generally to a certain new and useful improvement in vehicular sun visors and has for its object the provision of a visor of the type stated which is simple, durable, and economical in construction, which is universally adjustable for shading the eyes of the driver and passengers from the sun's rays irrespective of the relative positions of the sun and the vehicle and is particularly adapted for adjustment to provide, when desired, a substantially continuous and uninterrupted screen across the front of the vehicle windshield, which may be simply and conveniently manipulated for adjustment to its several positions, and which is highly efficient and satisfactory in the performance of its several functions.

And with the above and other objects in view, my invention resides in the novel features of form, construction, arrangement, and combination of parts presently described and pointed out in the claims.

Figure 5:
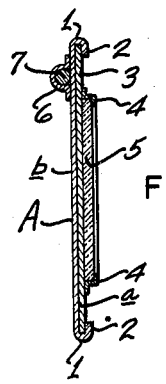
Figure 3:
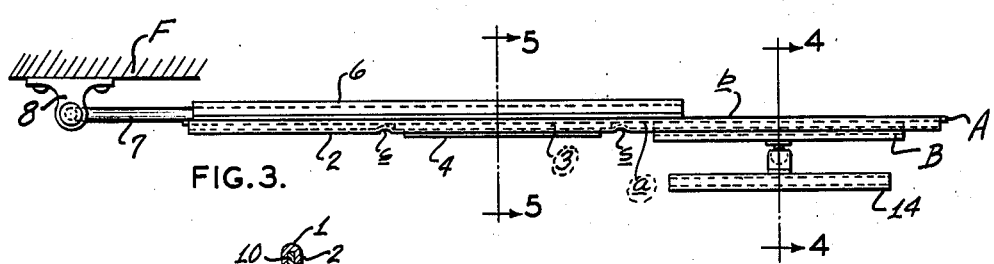
Figure 3 is a plan view of the main visor section.
Figure 4:
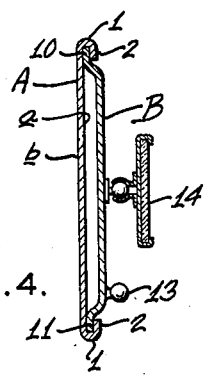

Figures 4 and 5 are transverse sectional views of the main visor section, taken approximately along the lines 4—4 and 5—5, respectively, Figure 3.

Referring now in more detail and by reference characters to the drawing, which illustrates a preferred embodiment of my invention, the visor includes a main panel A of oblong-rectangular shape and configuration and formed of any suitable plastic, metal, or other material. Along its opposite longitudinal margins, the panel A is bent over or flanged, as at 1, 1, and spaced outwardly from the panel face $a$ in the formation of slide-ways or channels 2.

Marginally disposed in the channels 2 and preferably positioned centrally of the panel A, is a fixed leaf 3, the flanges being crimped, as at $s$, for holding the leaf 3 permanently in place. Disposed, and as by a conventional rim-bead 4 secured, upon the outwardly presented face of the leaf 3, is a plain preferably circular or disk-shaped mirror 5, all as best seen in Figures 2 and 5 and for purposes presently fully appearing.

Figure 1:
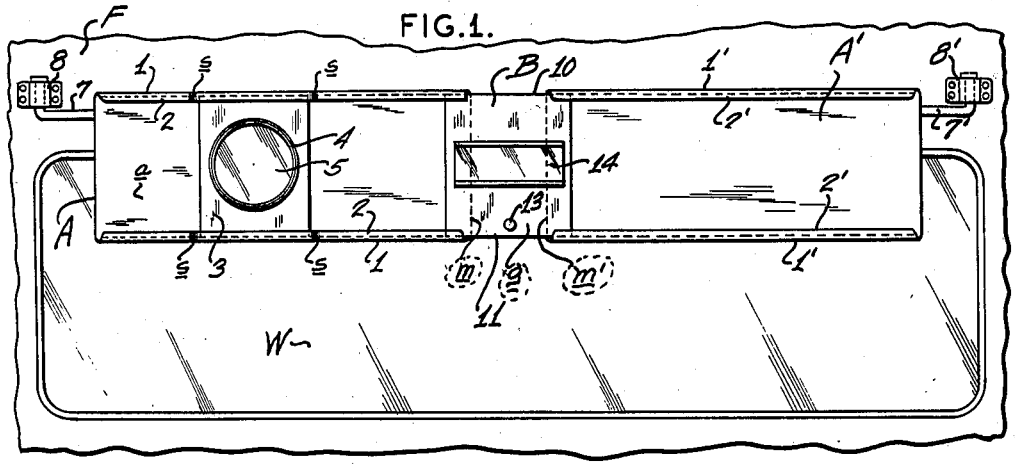
Figure 1 is an elevational view of a sun visor constructed in accordance with and embodying my present invention in installed position upon a vehicle windshield.
Figure 2:
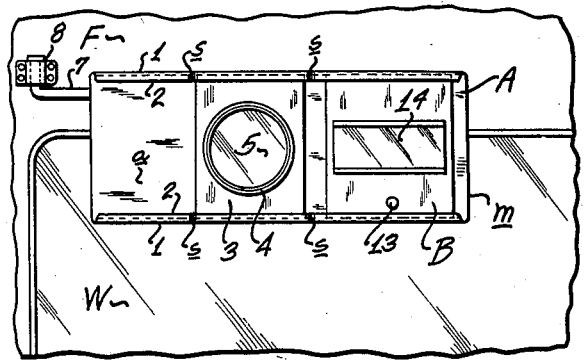
Figure 2 is a similar view, showing the main visor panel with its connector element or slide-leaf in withdrawn or retracted position.

On its opposite face $b$ and adjacent its upper longitudinal margin, the panel A is provided with a somewhat tubular sleeve-forming member 6 for rotarily receiving the free end of a bracket rod 7 conventionally swiveled at its other end in a suitable universal socket member or fixture 8, in turn, conventionally fixed by means of screws or other suitable securing means to the windshield frame structure F of the vehicle preferably adjacent the upper lefthand corner of the windshield W, all as best seen in Figures 1 and 2.

A' designates an auxiliary visor panel substantially identical in shape and construction to the main panel A, having bent-over flanges 1' forming slide-ways or channels 2' and being similarly mounted for rotation upon a bracket rod 7' swiveled in a socket member or fixture 8', in turn, fixed to the frame structure F adjacent the upper righthand corner of the windshield W.

By reference to Figure 1, it will be seen that the combined length of the two visor panels A, A', is substantially shorter than the horizontal width of the windshield W, so that there is a substantial gap between the opposing panel margins $m$, $m'$, when the panels A, A', are aligned in the same plane, as indicated at $g$. To span such gap $g$ and at the same time interlock or connect the two visor panels A, A', I provide a connecting member or slide-leaf B shiftably mounted at its upper and lower longitudinal margins 10, 11, in the channels 2 of the panel A and adapted for optional engagement in the corresponding channels 2' of the panel A'. Intermediate the margins 10, 11, the leaf B is preferably, though not necessarily, deformed outwardly from the panel face $a$ and is provided upon its outwardly presented face with a conventional manipulating knob or handle 13 and a conventional swivel-mounted rear vision mirror 14.

In use, the visor panels A, A', may be swung in front of the windshield W and individually tilted about the rods 8, 8', respectively, to any suitable angle for screening the eyes of the passengers from the rays of the sun or the headlights of an approaching vehicle, as the case may be. Similarly, the visor panels A, A', may be swung along the side or door windows of the vehicle for screening the eyes of the passengers from the sun's rays in the event that the sun happens to be on the side rather than in front of the vehicle. If desired, the two visor panels A, A', may be swung into co-planar alignment across the windshield W and the connecting member or slide-leaf B shifted from the position shown in Figure 2 into engagement beneath the flanges 1', 2', of the visor panel A', as shown in Figure 1, thereby screening off any glare or light rays which might otherwise pass through the gap g and impinge upon the eyes of the passengers or driver and, at the same time, making possible the simultaneously angular adjustment of the visor panels A, A'.

The visor is simple and inexpensive in structure, may be readily and easily installed, and fulfills in every respect the objects stated.

It should be understood that changes and modifications in the form, construction, arrangement, and combination of the several parts of the visor may be made and substituted for those herein shown and described without departing from the nature and principle of my invention.

Having thus described my invention, what I claim and desire to secure by Letters Patent is:

1. A vehicular sun visor comprising main and auxiliary panels each provided along its top and bottom margins with slideways and said panels being adapted for mounting upon a vehicle in spaced relation longitudinally and for swingable adjustment one independently of the other, in combination with a third panel normally disposed upon the rear face, and loosely mounted at its upper and lower margins in the slideways, of the main panel, said third panel being adapted for endwise slidable movement relatively to said main and auxiliary panels for also at its upper and lower margins partially engaging in the slideways of the auxiliary panel for bridging the space between the main and auxiliary panels and for detachably integrating the three panels into a single visor.

2. A vehicular sun visor comprising main and auxiliary panels each provided along its top and bottom margins with slideways and said panels being adapted for mounting upon a vehicle in spaced relation longitudinally and for swingable adjustment one independently of the other, in combination with a third panel normally disposed upon the rear face, and loosely mounted at its upper and lower margins in the slideways, of the main panel, said third panel being adapted for endwise slidable movement relatively to said main and auxiliary panels for also at its upper and lower margins partially engaging in the slideways of the auxiliary panel for bridging the space between the main and auxiliary panels and for detachably integrating the three panels into a single visor, and a mirror shiftable with, and presented rearwardly from, the third panel, said mirror being disposed intermediate the main and auxiliary panels when the three panels are in single visor formation.

MILLARD G. MANDEL.